J. A. ROBERTSON AND P. W. TIERNEY.
GUN CAMERA.
APPLICATION FILED FEB. 21, 1918.

1,318,803.

Patented Oct. 14, 1919.
7 SHEETS—SHEET 2.

WITNESSES:
Nelson H. Copp
Russell B. Griffiths

INVENTORS
John A. Robertson
Philip W. Tierney
BY Church & Rich
their ATTORNEYS.

J. A. ROBERTSON AND P. W. TIERNEY.
GUN CAMERA.
APPLICATION FILED FEB. 21, 1918.

1,318,803.

Patented Oct. 14, 1919.
7 SHEETS—SHEET 7.

WITNESSES:
Nelson H. Copp

INVENTORS
John A. Robertson
Philip W. Tierney
BY
their ATTORNEYS.

UNITED STATES PATENT OFFICE.

JOHN A. ROBERTSON AND PHILIP W. TIERNEY, OF ROCHESTER, NEW YORK, ASSIGNORS TO EASTMAN KODAK COMPANY, OF ROCHESTER, NEW YORK, A CORPORATION OF NEW YORK.

GUN-CAMERA.

1,318,803.  Specification of Letters Patent.  Patented Oct. 14, 1919.

Application filed February 21, 1918. Serial No. 218,483.

*To all whom it may concern:*

Be it known that we, JOHN A. ROBERTSON and PHILIP W. TIERNEY, of Rochester, in the county of Monroe and State of New York, have invented certain new and useful Improvements in Gun-Cameras; and we do hereby declare the following to be a full, clear, and exact description of the same, reference being had to the accompanying drawings, forming part of this specification, and to the reference-numerals marked thereon.

Our present invention relates to photography and more particularly to photographic cameras and it has for its object to provide, in combination with a machine gun or similar fire arm, a photographic exposing apparatus of simple, durable and efficient construction, the film or other sensitive material of which is utilized in lieu of the regular ammunition for recording, during practice or instruction, the course of the shots with reference to the point of aim. The invention contemplates the adaptation of the exposing mechanism to standard gun mechanism in such a way that the latter is operated and the sighting accomplished in the usual manner as if hits with regular ammunition were desired. To these and other ends the invention consists in certain improvements and combinations of parts all as will be hereinafter more fully described, the novel features being pointed out in the claims at the end of the specification.

In the drawings.

Similar reference numerals throughout the several views indicate the same parts.

In the present instance, we have illustrated the invention as embodied in a Lewis type machine gun which is the type largely used at the present time by aviators in aerial combat. Student aviators engaging in practice combats, ordinarily have no means of testing the accuracy of their aim with the gun as it cannot be made to operate with blank or dummy ammunition. Through the practice of our invention, the gun may be operated through the trigger, as usual, for a single shot or for a series of shots in rapid succession and at each shot a photographic exposure is made of a limited field along the line of sight of the gun. If the target appears in this field, the aim is good and if appears in the center of the field as defined by appropriate markings photographically recorded on the picture, it is known that a hit has been made or would have been made had regular ammunition been used. The student is therefore not only drilled in the mechanical operation of the gun but a check on the accuracy of his aim is obtainable. The foregoing is cited as an instance of the utility of the invention and as illustrative of its general purposes.

Referring first to the general features of the machine gun, 1 indicates the stock, 2 the butt, 3 the pistol grip in rear of the trigger 4 and trigger guard 5, 6 the barrel, 7 the gas chamber and 8 the cocking piece. The gun is first cocked by drawing back the knob 8 that feeds the first cartridge from a magazine (not shown) arranged above the stock. Thereafter, the gas generated by firing returns through the chamber 7 and automatically actuates the feeding mechanism. The rear sight 9 (Figs. 1, 2 and 15) consists of an outer ring and an inner concentric ring 10, the former defining the field generally and, in the present instance, the field of the photographic exposure, as hereinafter described, and in aiming, the line of sight to the target is determined by bringing a bead 11 on the front sight into the center of the inner ring 10 of the rear sight, in the manner represented in Fig. 15.

Figure 1:
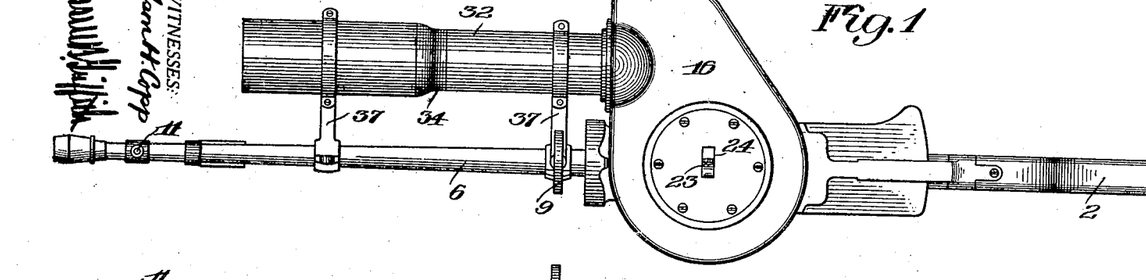
Figure 1 is a top plan view of a machine gun fitted with a photographic exposing apparatus constructed in accordance with and illustrating one embodiment of our invention.
Figure 2:
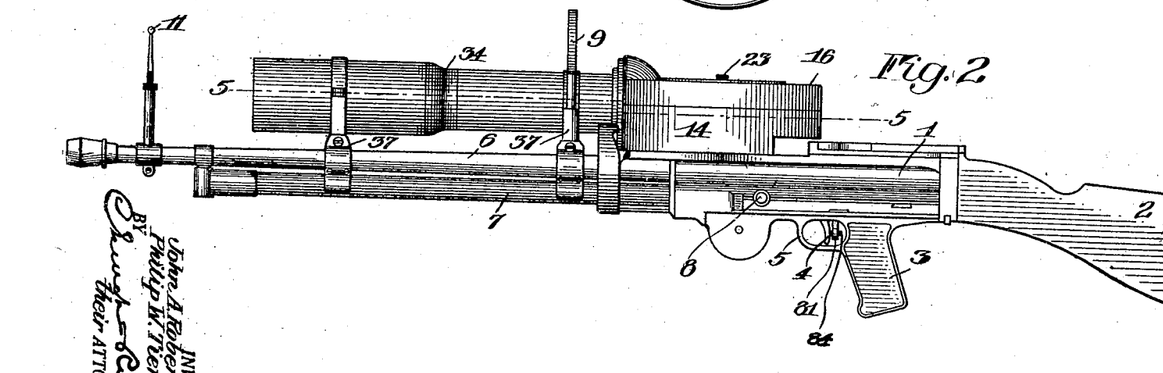
Fig. 2 is an elevation of the left side of the gun camera.
Figures 7, 8:
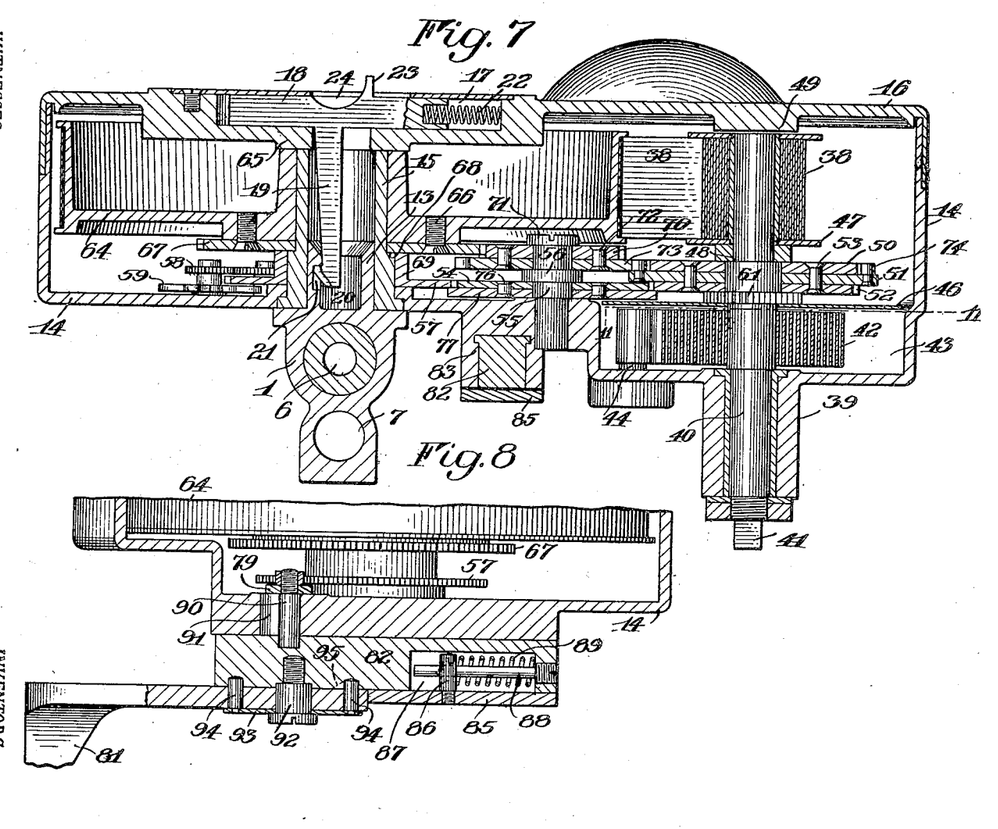
Fig. 7 is a reduced section taken substantially on the line 7—7 of Fig. 6.
Fig. 8 is an enlarged fragmentary section taken substantially on the line 8—8 of Fig. 4.

Referring now more particularly to Figs. 1, 2 and 7, there is formed on the stock 1 of the machine gun an upstanding tubular pivot 13 designed for the mounting of the magazine that may be lifted off in an upward direction. Interchangeably with the gun or cartridge magazine, we utilize this pivot for the mounting of a photographic magazine embodying a roll holding camera casing 14. Within and fixed to the bottom of this casing is a pivot sleeve 15 that fits over the pivot 13. The casing has a removable flange cover 16 provided with a chamber 17 for a sliding latch 18. An arm 19 on the latch projects downwardly through the pivots 15 and 13 and a shoulder 20 thereon is normally engaged in a notch 21 in the interior of the inner pivot by a spring 22, and the casing is in this way locked to the gun while, by the same means, the cover 16 thereof is locked to the casing. A fingerpiece 23 on the latch 18 projecting through a slot 24 in the top of the cover is pressed to release the latch for the removal of the cover or the magazine.

Figures 5, 11:
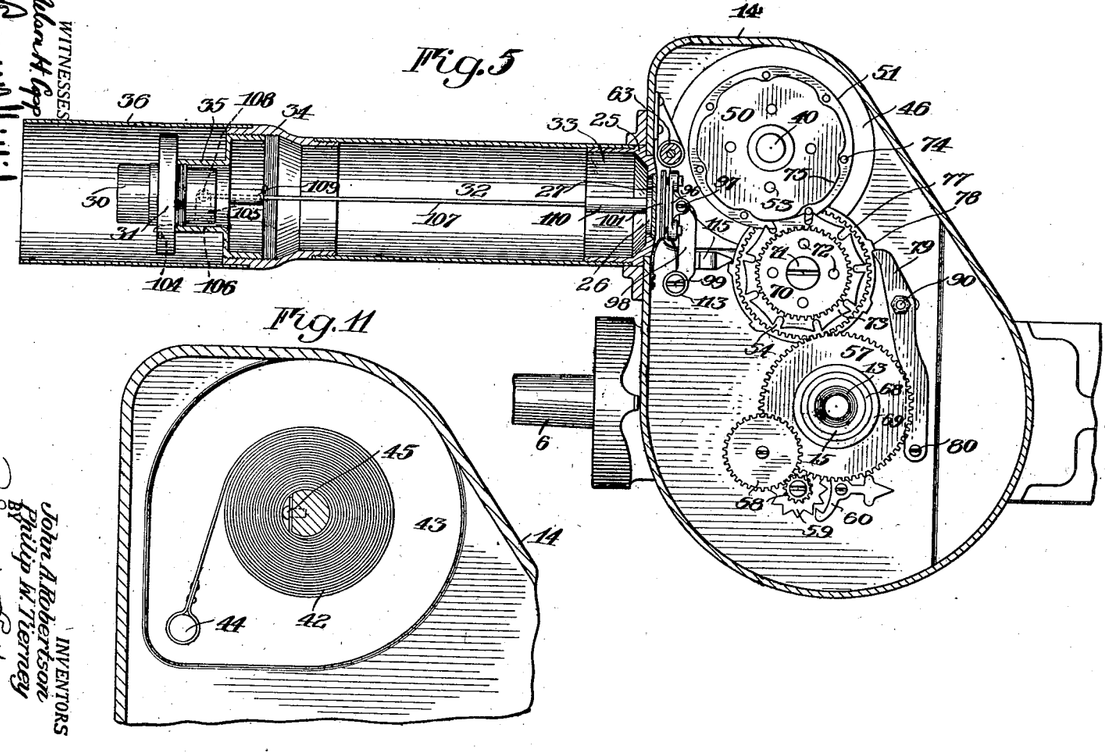
Fig. 5 is a horizontal section through the exposing apparatus on a slightly enlarged scale taken substantially on the line 5—5 of Fig. 2 and with certain parts of the film winding mechanism removed.
Fig. 11 is a fragmentary section through the spring motor taken substantially on the line 11—11 of Fig. 7.
Figures 13, 14, 15:
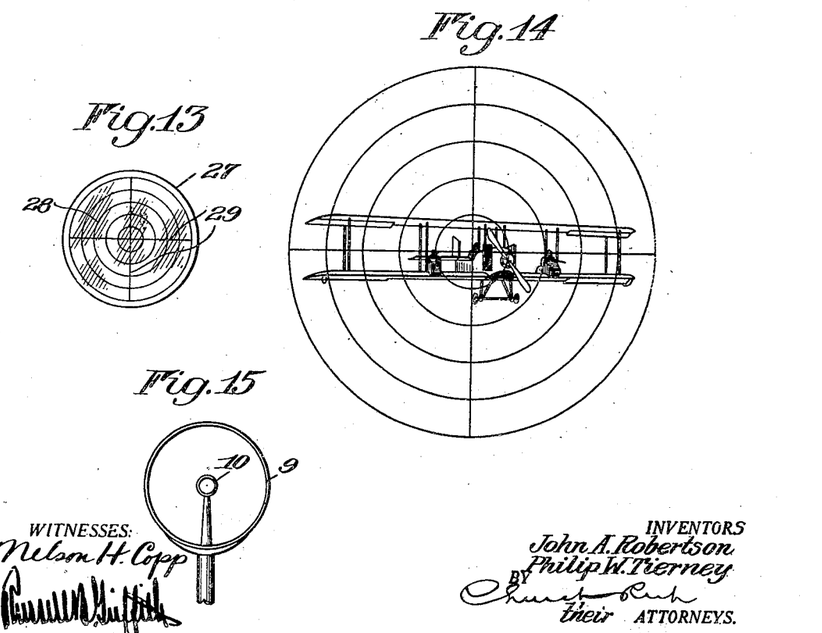
Fig. 13 is a face view of a masking plate used in front of the film to photograph the sight line of the gun upon the picture.
Fig. 14 is a diagrammatic view of a picture made with the apparatus.
Fig. 15 is a view of the gun sights taken along the line of sight.

Referring briefly to Fig. 5, a frame 25 set into the front wall of the casing 14 has an opening 26 therein constituting the exposure opening of the camera. Within the opening is set a glass or other transparent plate 27 shown in detail in Fig. 13. The plate transmits light with the exception of opaque or light resisting lines thereon forming a plurality of concentric circles 28 with cross hairs 29 drawn diametrically through them at right angles to each other. The point of intersection of the lines indicates the center of the picture and the target will produce a photographic image centered with reference to this point in accordance with the accuracy of the line of sight with reference to the center of the actual target. In Fig. 14 a photographic image of an aeroplane that has been properly centered as a result of accurate sighting, is shown with the accompanying print of the plate 27. The hit is shown scored on the pilot of the machine.

Still referring principally to Fig. 5, the image of the target or object is cast by a lens in a lens tube 30 through a shutter 31 down a tube 32 that constitutes the dark chamber of the camera. This tube 32 is secured at its rear end to a collar 33 on the frame 25 and carries at its front end a coupling sleeve 34 supporting the mount 35 for the lens and shutter within a hood 36 that projects beyond the lens to shade and protect it. Aside from the magazine pivot 13 of the gun, the camera is additionally supported by brackets 37 suitably clamped on the barrel 6. To remove it, these brackets are disengaged and it is lifted off of the pivot stud 13 in an upward direction to be replaced, if required, by the cartridge magazine of the machine gun.

A continuous film strip 38 (Fig. 6) is fed intermittently past the exposure opening 26 in the focal plane of the camera by film feeding mechanism that will now be described.

A boss 39 (Fig. 7) depending from the casing 14 at the right of the gun provides a bearing for a motor shaft 40 having a squared end 41 projecting below the boss to which a suitable crank may be applied to wind a spring 42 encircling the shaft. This spring occupies a chamber 43 below the general level of the casing, its outer end being anchored at 4 (Fig. 11) and its inner end being secured to the motor shaft 40 at 45. A plate 46 at the level of the floor of the casing isolates it from the mechanism above. The film 38 is wound on a supply spool 47 that may turn loosely on the upper end of the motor shaft 40 against a shoulder 48 to which it is held and prevented from rising by a boss 49 on the cover 16. Also turning loosely on the motor shaft below the shoulder 48 are three disks or plates 50, 51 and 52 fastened together at 53. The lower one 52 is a gear that meshes with an intermediate gear 54 on a stud 55 below a collar 56, said stud being suitably fixed in the floor of the casing 14. The gear 54 in turn meshes with a gear 57 that turns loosely on the pivot sleeve 15 and drives gearing 58 (Figs. 5 and 6) of an escapement mechanism terminating in a star wheel 59 and anchor 60. All of this mechanism is to provide a governor to render uniform the spring driven movement of the motor shaft 40. The energy of the spring is imparted to the latter in a counter-clockwise direction as to Fig. 6, for instance, by a ratchet wheel 61 fixed to the shaft 40 above the plate 46 with which coöperates a spring pressed pawl 62 on the under side of the gear 52. This, of course, is to permit the winding of the spring in the opposite direction by turning the squared end 41 of the shaft without driving the governor or other parts.

From the supply reel 47, the film strip 38 passes over a guide roll 63 (Fig. 6) onto a winding reel 64 of large diameter. This winding reel (Fig. 7) turns on the pivot sleeve 15 of the casing 14 and, like the feed reel, is detachable in an upward direction being normally held down by a boss 65 on the cover 16. On its under side there is secured as by screws 66 a gear 67 through the medium of which the reel rests upon a shoulder 68 of the pivot and upon a hub 69 on the gear 57. The gear 67 and hence the winding drum is driven by a gear 70 that turns on the stud 55 beneath a confining screw head 71. It is secured by rivets 72 to a Geneva gear 73 so that the two ride upon the collar 56 of the stud. The Geneva gear is rotated intermittently by the plates 50 and 51 on the motor shaft heretofore described and which constitute a pin gear, the one being provided with pins 74 and the other with intervening segments 75, this intermittent form of drive being well known in the mechanical art. Having in mind the fact that this pin gear is fixed to the gear plate 52 that carries the pawl 62, it will be seen that the normal tendency of the motor spring 42 is to intermittently turn both the winding drum 64 and the escapement mechanism. Each impulse turns the winding drum sufficiently to carry an exposed picture area of the film strip from register with the exposure aperture 26 and momentarily halt the succeeding unexposed picture area in register with the opening.

Figure 6:
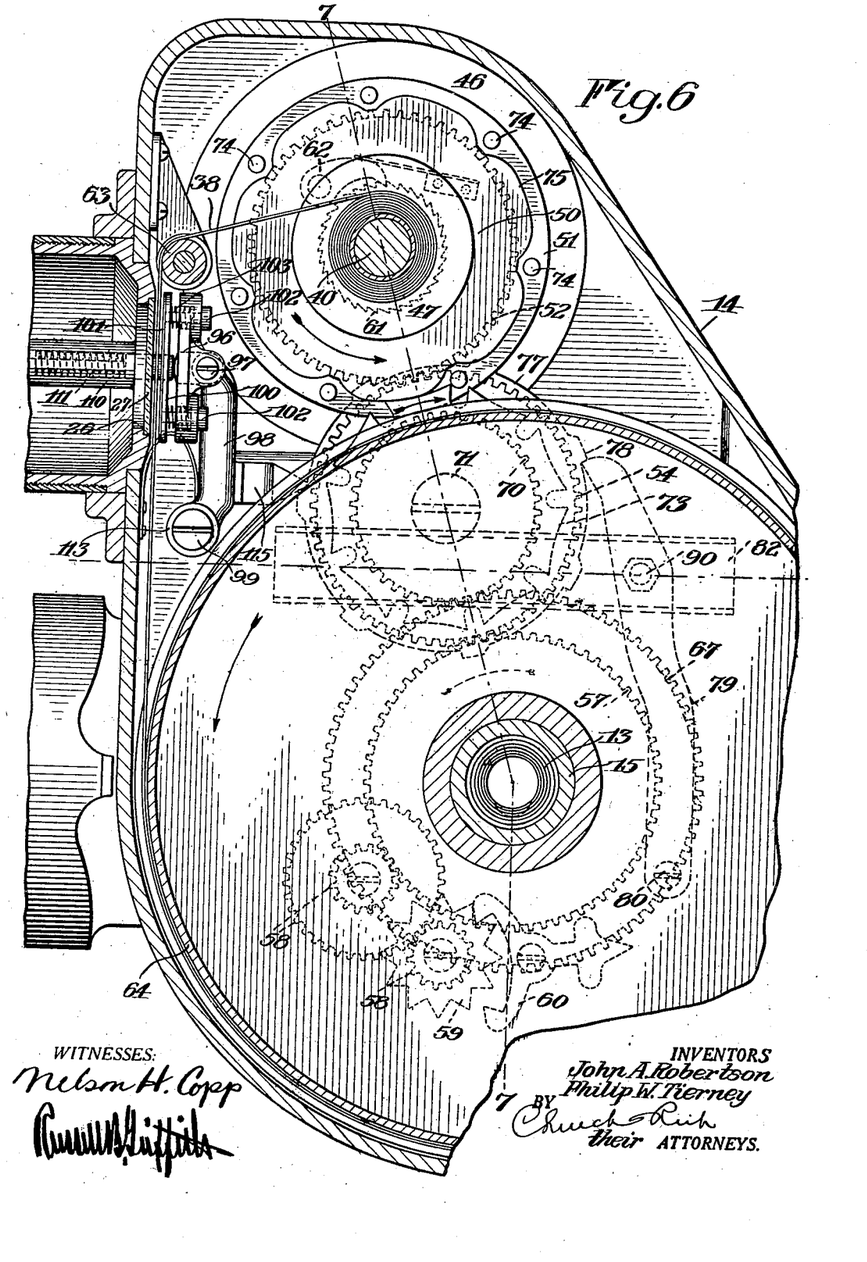
Fig. 6 is an enlarged fragmentary section similar to Fig. 5.

To restrain and control the feed or winding movement a stop mechanism best shown in Figs. 5 and 6 is interposed to act upon the intermediate elements that turn on the stud 55 in the chain of gearing leading to the escapement governor 59—60. In the present instance, there is secured by rivets 76 to the intermediate gear 54 a stop disk 77 having stops 78 thereon spaced apart sufficiently to equal the travel of the gearing during the feed of one picture area of the film. Normally engaging one of the stops is a detent 79 pivoted at 80 to the floor of the casing 14. While this stop is held out, the intermittent feed will continue but when moved to operative position, it will engage an adjacent stop though not necessarily immediately as this might result in feeding only half a picture area. The succeeding stop does not engage until the feed has been completed.

Figures 3, 4:
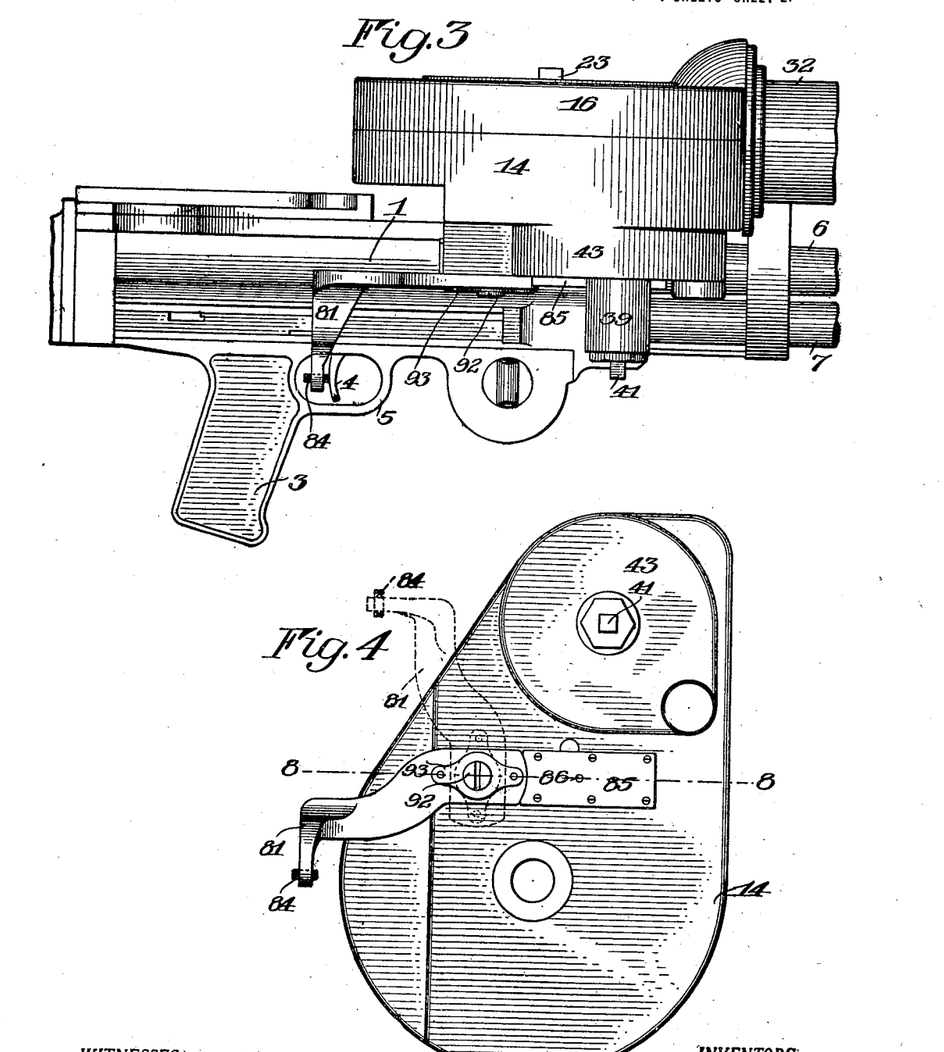
Fig. 3 is an enlarged fragmentary view of the right side of the magazine or roll holder.
Fig. 4 is an enlarged bottom plan view of the roll holder detached.

The detent 79 is under the control of a trigger that may be pulled jointly with the trigger 4 of the machine gun. Referring more particularly to Figs. 3, 4 and 7, the trigger mechanism comprises an arm 81 on a slide 82 that reciprocates in a guideway 83 in the floor of the casing 14 which arm extends into the trigger guard 5 and contacts through a set screw 84 with the rear of the gun trigger 4. A bottom plate 85 for the guideway 83 (Fig. 8) carries a pin 86 projecting into a chamber 87 in the slide 82 and serves as a guide for a pin 88 fixed in the end of the slide 82 and as an abutment for one end of a spring 89 that acts against the slide to hold it in a forward position. On the slide is a pin 90 working in a slot 91 in the floor of the casing 14 and this pin connects as shown in Fig. 5, for instance, with the detent 79. Therefore, when the trigger 4 is pulled as in the ordinary operation of the machine gun, it withdraws the detent 79 and when the trigger is released, the detent returns to engagement under the influence of spring 89.

In order that the trigger mechanism may not interfere with lifting the camera off of the gun in the manner previously described, the trigger arm 81 is preferably in the form of a lever pivoted at 92 to the slide 82. Confined beneath the head of the pivot is a spring plate 93 carrying centering pins 94 that extend through arm or lever 81 as shown in Fig. 8 and have rounded ends cooperating with cam recesses 95 in the slide 82, one of which is shown in dotted lines in the said figure. This permits the arm to be quickly rotated laterally to the dotted-line position of Fig. 4 in which it leaves the trigger guard 5 and clears the gun as the camera is lifted upwardly.

Figure 12:
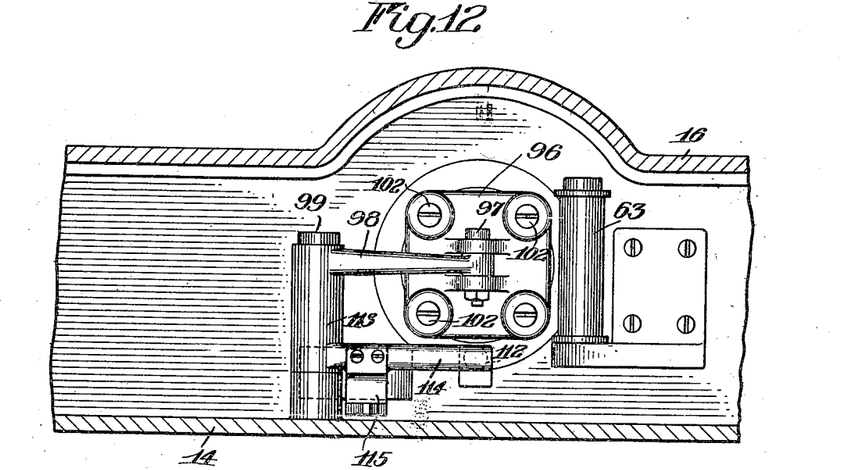
Fig. 12 is a rear elevation of the film presser plate shown in top view in Fig. 6.

As each picture area of the film strip is halted in the field of exposure, mechanism is provided for pressing it against the flat support furnished by the frame 25 and glass plate 27 which mechanism acts automatically to release it for the succeeding feeding impulse. This mechanism comprises, in the present instance, (see particularly Figs. 6 and 12) a platen 96 pivotally carried at 97 on an arm 98 that is adapted to swing on a pivot 99 secured in the floor of the casing 14 at one side of the exposure opening 26. This platen has a yielding face plate 100, preferably covered with felt 101 and is carried on guide pins 102 extending through the platen and headed on the rear side to limit the outward movement of the face plate under the influence of compression springs 103 interposed between the plate and platen. The platen is hence capable of swinging toward the rear face of the film 38 and clamping it with a uniform pressure at all points into an exact position in the focal plane against the frame 25 and glass plate 27.

Figure 9:
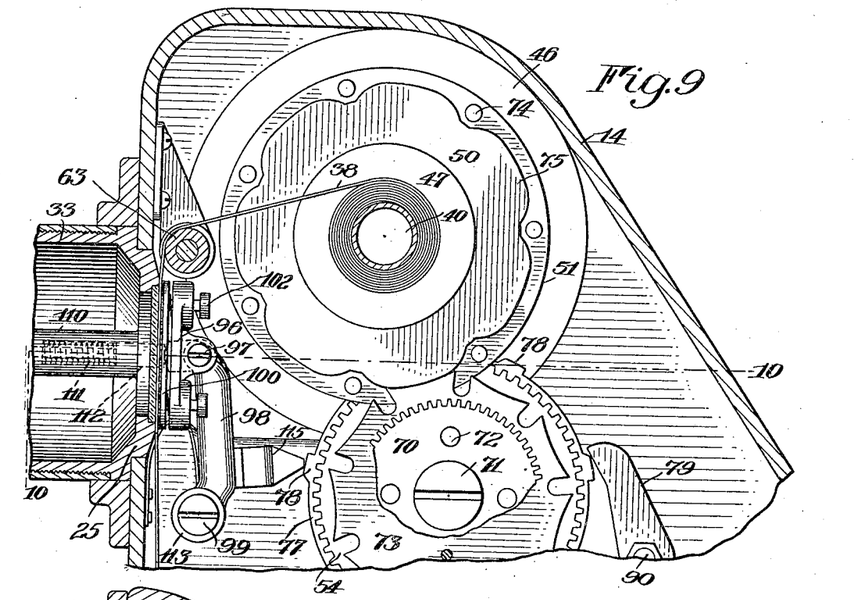
Fig. 9 is a fragmentary view similar to Fig. 6 with the parts in another position.
Figure 10:
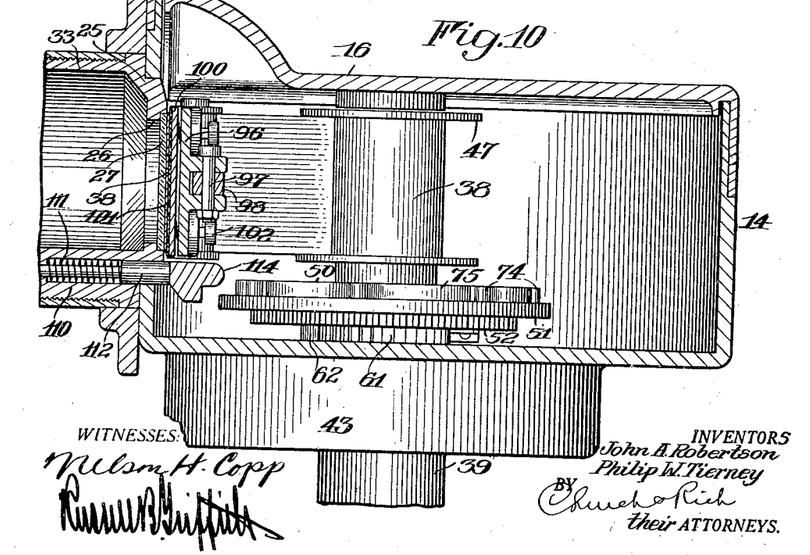
Fig. 10 is a section taken substantially on the line 10—10 of Fig. 9.

This movement is also utilized to trip the shutter 31 and make the exposure. The usual type of pivoted blade automatic camera shutter may be used. It is not shown in detail herein but its operating member is indicated in dotted lines in Fig. 5 at 104. A bell crank 105 pivoted at 106 to the mounting 35 is arranged to trip the shutter under the influence of a push rod 107 lying at the bottom of the tube or exposure chamber 32 and pivoted to the bell crank at 108. The push rod slides in bearings 109 and 110 in the mounting 35 and frame 25, respectively, and in the latter bearing (Fig. 10) is confined a compression spring 111 acting against a head 112 on the push rod to thrust it and the rod rearwardly into the interior of the main casing 14. Looking now also at Fig. 12, there is a hub 113 on the swinging platen arm 98 that is provided with an arm 114 adapted to engage the head 112 and thrust the rod 107 forwardly to actuate the shutter as the platen is brought into clamping engagement with the film, as shown in Figs. 9 and 10. A contact arm 115 is secured to the arm 114 to project into the path of the stops 78 on the disk 77 which stops, besides coöperating with the detent 79 as before described, act as cams for swinging the platen arms to clamp the film and actuate the shutter in timed relation to the movements of the feeding mechanism, that is, during the intervals in the intermittent movements of the drive gearing. One of the stops 78 is so shown operating as a cam in Fig. 9, it being noted that the detent 79 has just been released from one of the stops and is going back into the path of the succeeding one which it will engage only after a movement of the gearing sufficient to release the platen and shutter and wind off a picture area of the film in the order named.

With a device constructed in accordance with our invention, it will be seen that the machine gun does not have to be modified in any particular to receive the photographic apparatus which may be easily removed and applied interchangeably with the ammunition magazine. Just as in the firing of ball cartridges, the trigger 4 may be pressed once for a single actuation or exposure resulting in one picture, or it may be held pulled for a series of photographs in rapid succession. The device may be used in any situation where machine gun practice is desired either with a saving of ammunition or safety to the target and the results accurately recorded.

We claim as our invention:

1. The combination with a machine gun having a magazine pivot projecting therefrom, of a photographic camera detachably mounted on said pivot.

2. The combination with a machine gun having a magazine pivot projecting therefrom, of a photographic camera detachably mounted on said pivot, said camera comprising a case and a detachable cover therefor, and a latch coöperating with the pivot for securing the cover to the case, said latch also operating to secure the camera upon the machine gun.

3. The combination with a machine gun having a magazine pivot projecting therefrom, of a photographic camera detachably mounted on the pivot and a latch on the camera coöperating with the pivot to secure the camera to the machine gun.

4. The combination with a machine gun having a tubular magazine pivot projecting therefrom, of a photographic camera detachably mounted on the pivot, a detachable cover for the camera and a latch on the cover coöperating with the interior of the pivot to secure the cover on the camera and also secure the latter on the machine gun.

5. The combination with a support having a post thereon, of a camera detachably mounted on the post and having a detachable cover and a latch coöperating with the post to secure the cover to the camera and the camera to the post.

6. The combination with a machine gun having a tubular pivot projecting therefrom, of a photographic roll holder having a tubular pivot post fitting over that on the machine gun to detachably mount the roll holder thereon, a film drum in the roll holder turning on the pivot post of the holder, a detachable cover for the roll holder, and a latch on said cover projecting through the tubular elements and coöperating with the magazine pivot to secure the cover on the roll holder and the latter on the machine gun.

7. The combination with a machine gun having a magazine pivot thereon, of a camera casing detachably mounted on the pivot, a lens carrying element extending forwardly from the casing and brackets on the barrel of the machine gun supporting said lens carrying element.

8. The combination with a machine gun having a stock and a trigger beneath the same, of a camera detachably mounted on the machine gun to lift off in an upward direction and embodying film feeding mechanism including a motor, of a detent controlling the film feeding mechanism and an operating trigger for the detent having an operative position in association with the machine gun trigger for joint actuation therewith and a relatively lateral inoperative position to permit the removal of the camera from the machine gun.

9. The combination with a machine gun having a stock and a trigger beneath the same, of a camera detachably mounted on the machine gun to lift off in an upward direction and embodying exposing mechanism, of an operating trigger for the exposing mechanism of the camera extending beneath the stock from a lateral direction and having an operative position in association with the machine gun trigger for joint actuation therewith and a relatively lateral inoperative position to permit the removal of the camera from the machine gun.

10. The combination with a machine gun having a stock and a trigger beneath the same, of a camera mounted on the machine gun and embodying film feeding mechanism including a motor, a detent controlling the film feeding mechanism, and an operating trigger for the detent arranged in association with the machine gun trigger for joint actuation therewith.

11. The combination with a machine gun having a stock and a trigger beneath the same, of a camera detachably mounted on top of the machine gun to lift off in an upward direction and embodying exposing mechanism, of an operating trigger for the exposing mechanism of the camera comprising a slide in the camera extending longitudinally of the machine gun, a lever pivoted to the slide to occupy an operative position in association with the machine gun trigger for joint actuation therewith or a lateral inoperative position permitting the removal of the camera and spring centering devices acting between the slide and lever to maintain the latter in operative position.

12. The combination with a photographic exposing apparatus, of a film feeding mechanism comprising a motor shaft, a driving spring thereon, a feed reel rotatable freely on the shaft, a winding reel, a shaft therefor, escapement mechanism embodying a gear rotatable freely on the winding reel shaft, intermediate gearing between the motor shaft and winding reel, and intermediate gearing between the motor shaft and the escapement mechanism.

13. The combination with a photographic exposing apparatus, of a film feeding mechanism comprising a motor shaft, a motor spring and a ratchet thereon, a feed reel rotatable freely on the shaft, a winding reel, a pin gear on the motor shaft having a pawl thereon coöperating with the ratchet, a Geneva gear driven by the pin gear, intermeshing gears fixed to the Geneva gear and the winding reel, respectively, and a detent for restraining one of the elements of said gearing.

14. In a photographic camera having a dark chamber, the combination with a lens and shutter arranged forwardly of the dark chamber, a support having an exposure opening therein at the rear of the chamber, a shutter operating member extending from the shutter to the said support and means for feeding film intermittently past the exposure opening, of a device operable to intermittently press the film against the support and also adapted to actuate the shutter operating member.

15. In a photographic camera, the combination with a lens, a shutter, a shutter operating member, a support having an exposure opening therein and means including a rotary element for feeding film intermittently past the exposure opening, said rotary element having cams thereon, of a device operable to intermittently press the film against the support and also adapted to actuate the shutter operating member, said device being itself actuated by the cams on the rotary element.

16. In a photographic camera, the combination with a support having an exposure opening therein, means including a rotary element for feeding film past the exposure opening, said rotary element having stops thereon, and a detent coöperating with the stops to control the feeding means, of a device operable to intermittently press the film against the support, said device being actuated by cam action of the stops on the rotary element.

JOHN A. ROBERTSON.
PHILIP W. TIERNEY.

Witnesses:
EDITH WATERSTRAAT,
HELEN M. FRASER.